United States Patent [19]
Kitagawa et al.

[11] Patent Number: 5,930,531
[45] Date of Patent: *Jul. 27, 1999

[54] IMAGE SHIFTING APPARATUS

[75] Inventors: Yoshihisa Kitagawa, Kasukabe; Tadao Kai, Kawasaki, both of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/688,264

[22] Filed: Jul. 29, 1996

[30] Foreign Application Priority Data

Sep. 12, 1995 [JP] Japan .................................. 7-233926
Sep. 12, 1995 [JP] Japan .................................. 7-234115

[51] Int. Cl.$^6$ .................................................. G03B 39/00
[52] U.S. Cl. ........................................................ 396/55
[58] Field of Search ........................ 396/52–55; 348/208; 359/554–557

[56] References Cited

U.S. PATENT DOCUMENTS 4,970,540  11/1990  Vasey et al. ............................. 396/55
5,172,276  12/1992  Ueyama et al. ........................ 359/813
5,581,404  12/1996  Misaka et al. ........................... 396/59
5,619,293   4/1997  Usui ......................................... 396/55

FOREIGN PATENT DOCUMENTS 4-39616   6/1990  Japan .
4-113338  9/1990  Japan .
3-110530  5/1991  Japan .
5-66451   9/1991  Japan .

*Primary Examiner*—Safet Metjahic
*Assistant Examiner*—Michael Dalakis

[57] ABSTRACT

An image shifting apparatus includes a frame for holding at least a portion of a photographing optical system, and a holding mechanism for holding the frame within a plane substantially perpendicular to an optical axis of the photographing optical system, and causing a force corresponding to a distance between the optical axis and a center of the optical system to act on the frame. At least two drive mechanisms drive the frame within a plane perpendicular to the optical axis in at least two directions which are not parallel to each other with forces corresponding to supplied power. A drive circuit drives at least two drive mechanisms, a power source supplies power to at least two drive mechanisms via the drive circuit, and a controller controls the drive circuit to set the distance to a predetermined value determined by optical characteristics of the photographing optical system and a moving range of the optical system held by the frame, so as to determine an initial position of a driving center of the frame when the distance between the optical axis and the center of the optical system held by the frame is not less than the predetermined value in a natural state in which the drive mechanism is not operated.

5 Claims, 8 Drawing Sheets

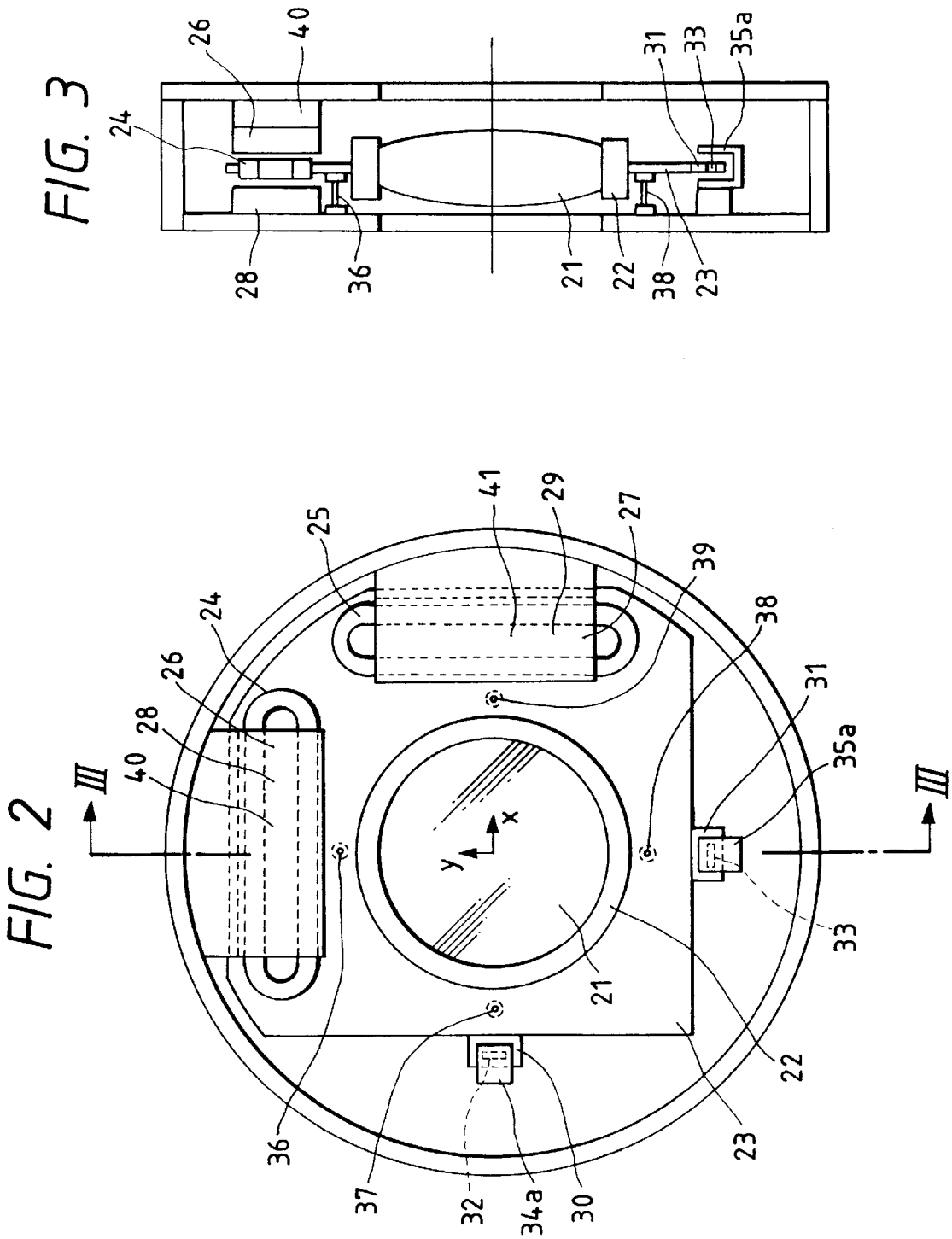

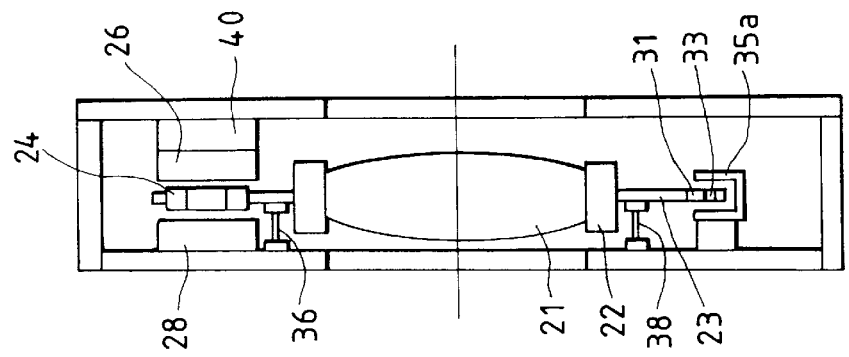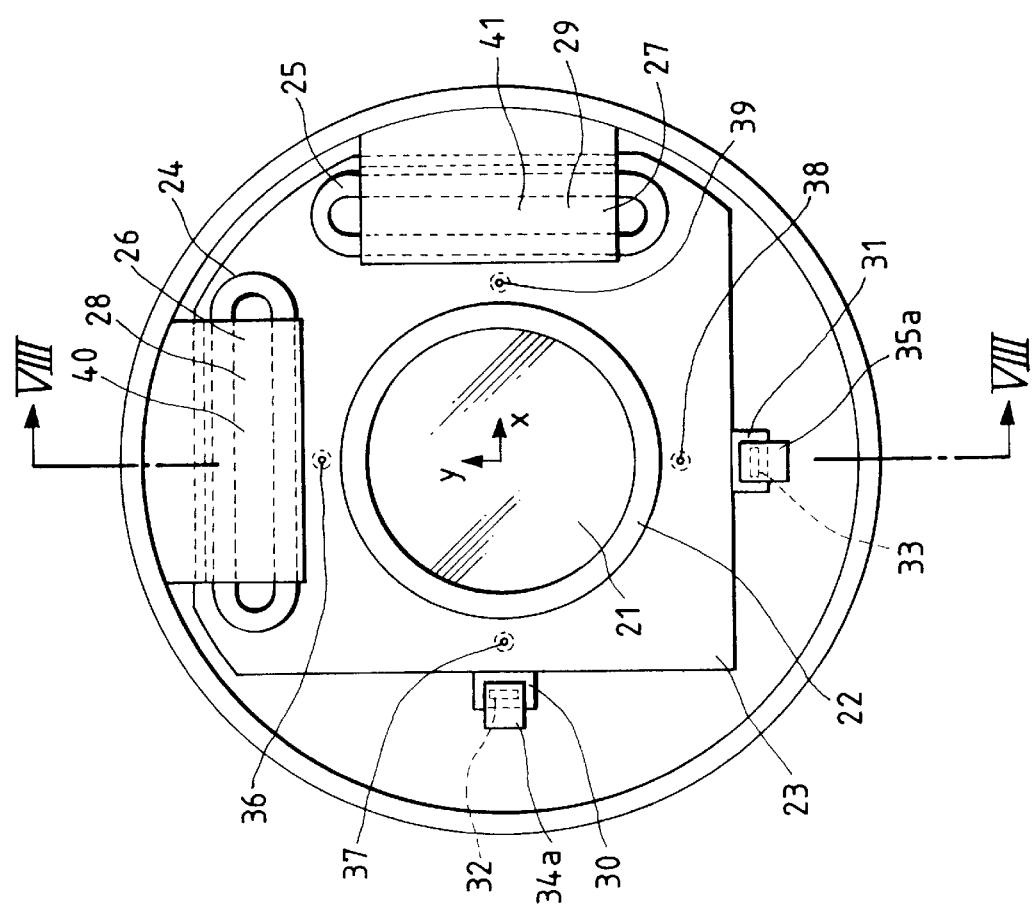

IMAGE SHIFTING APPARATUS

BACKGROUND OF THE INVENTION

1. Field of the Invention

The present invention relates to an image shifting apparatus for reducing the vibration of an object image by shifting the object image on the photographing plane of a photographing optical system.

2. Related Background Art

In a conventional photographing device such as a camera, even a slight movement of a photographer during a photographing operation (exposure) causes an object image on a photographing plane (e.g., a film surface) to shift. The resultant photograph is a so-called blurred photograph with unclear contours. In order to solve such a problem, an image shifting apparatus has recently been studied and developed. This apparatus reduces the vibration of an object image on a photographing plane (this operation will be referred to as "vibration reduction" hereinafter) by shifting a vibration reduction optical system constituted by part or all of a photographing optical system during an exposure operation so as to counteract the movement of the photographer.

As such an image shifting apparatus, for example, Japanese Laid-Open Patent Application No. 3-110530 (the counterpart of which is U.S. Pat. No. 5,172,276) discloses an apparatus for performing vibration reduction by shifting a vibration reduction optical system (to be referred to as a "VR lens" hereinafter) within a plane perpendicular to the optical axis of a photographing optical system. In this apparatus, the VR lens is supported within a plane perpendicular to the optical axis by an X-Y stage movable in the X and Y directions perpendicular to the optical axis, and two motors are used as drive sources for driving the VR lens. The rotational motions of the motors are slowed down by predetermined reduction gears and converted into two linear motions which are not parallel to each other by lead screws or the like. The resultant motions are transferred to the X-Y stage. As a result, the VR lens is moved within a plane almost perpendicular to the optical axis.

When the X-Y stage is used in the above manner, the VR lens may not be smoothly moved because of friction produced on the X-Y stage. In order to solve such a problem and ensure smooth movement of the VR lens, a method of supporting the VR lens in a lens barrel with elastic members has recently been used. More specifically, a plurality of cylindrical elastic members are arranged in the lens barrel such that the axis of each cylindrical member becomes parallel to the optical axis, and the VR lens is cantilevered on end portions of the elastic members. With this structure, the VR lens can be smoothly moved within a plane defined by the end portions of the elastic members.

When a rotary motor such as a DC motor is used as a drive source, the rotational motion of the motor must be slowed down and converted into a linear motion by using gears. With these gears, however, it is difficult to prevent generation of noise. In contrast to this, there have recently been strong demands for photographing devices, especially home photographing devices capable of low-noise operations. Under the circumstances, the use of a voice coil motor (to be referred to a "VCM" hereinafter) as a drive source for a VR lens has been proposed. The voice coil motor can directly supply a linear drive force to the VR lens without the mediacy of any mechanical mechanism. The VCM is a motor for generating a drive force by using an electromagnetic force generated by a current and a magnetic force. This motor is characterized in that it generates a linear drive force proportional to the magnitude of a current for energization.

In the above conventional image shifting apparatus, since the VR lens is supported by the elastic members, if, for example, the photographing device is held such that the axis of each cylindrical elastic member is set horizontally, the VR lens moves downward owing to the effect of the weight of the lens. As a result, the center of the VR lens is offset from the optical axis in a natural state. For this reason, in the conventional image shifting apparatus, even if no vibration reduction is to be performed, the VCMs must be driven to generate a force against the gravity in order to make the center of the VR lens coincide with the optical axis. As a result, the conventional image shifting apparatus greatly consumes power. Therefore, for example, in a portable photographing device using only a built-in battery having a limited capacity, the service life of the battery is shortened.

In order to solve the above problem, there has been proposed a method of setting the start position of vibration reduction driving (to be referred to as "VR driving" hereinafter) at the position where the elastic force of the elastic members for supporting the VR lens balances with the gravity acting on the VR lens and the like. When VR driving is performed by this proposed method, since the initial position of the VR lens is offset downward from the optical axis, the VR lens can move to a position separated further from the optical axis in the gravitation direction. For this reason, when the VR lens is driven in the gravitation direction, the resultant image tends to deteriorate because of an aberration. In addition, if driving of the VR lens is stopped within a range in which no aberration is caused, the range of vibration which can be reduced is narrowed.

When the VR lens is moved in the above manner, although the object image can be moved within the photographing plane, the image on the photographing plane is influenced by an aberration with an increase in the moving amount of the VR lens. As a result, the object image deteriorates. The degree of the influence of an aberration varies depending on the performance of an optical system to be used. In any case, the VR lens cannot be moved unlimitedly, and must be moved within a predetermined range.

In conventional image shifting apparatuses, therefore, various methods are used to limit the moving ranges of VR lenses. For example, a conventional method of mechanically limiting the moving range of a VR lens (this operation will be simply referred to as "correction limitation" hereinafter) is known. This method uses a rotary motor as a drive source for the VR lens. The rotational motion of this motor is slowed down by reduction gears and converted into a linear motion, which is used as a drive force for the VR lens. Limiting members are arranged around the VR lens at predetermined intervals. When the VR lens is moved by the above drive force by a predetermined distance or more from the optical axis, the movement is inhibited by the limiting members, thus performing correction limitation.

Another method is disclosed in Japanese Laid-Open Patent Application No. 3-110530. According to Japanese Laid-Open Patent Application No. 3-110530, an image shifting apparatus includes a disk integrally mounted with a portion of a reduction gear train engaged with the pinion gear of a pulse-driven rotary motor as a drive force for a VR lens. This disk has one hole. This image shifting apparatus also includes a photointerrupter mounted to sandwich a peripheral portion of the disk with the hole. When the image shifting apparatus drives the VR lens, i.e., the rotary motor produces a rotational motion, the photointerrupter detects the rotational position of the disk on the basis of light beam outputs transmitted through the hole of the disk. In this case, the detected outputs are used to detect the rotational position of the pinion gear of the motor. With this operation, the motor is controlled such that the number of drive pulses representing the rotational position of the motor and output from the photointerrupter does not exceed a predetermined value. In this manner, correction limitation is performed.

In the above image shifting apparatus for mechanically performing correction limitation, correction limitation is not performed by stopping the motor, but is simply performed by mechanically inhibiting the movement of the VR lens using the limiting members. For this reason, power for driving the VR lens is wasted. This poses a serious problem in a portable photographing device such as a camera incorporating a battery having a limited capacity as a power source.

In the image shifting apparatus for performing correction limitation on the basis of the number of pulses detected by the photointerrupter, a complicated control system must be used for correction limitation. It is therefore difficult to propose an inexpensive image shifting apparatus.

SUMMARY OF THE INVENTION

In order to solve the above problems, according to the present invention, there is provided an image shifting apparatus comprising a frame for holding at least a portion of a photographing optical system, a holding mechanism for holding the frame within a plane substantially perpendicular to an optical axis of the photographing optical system, and causing a force corresponding to a distance between the optical axis and a center of the optical system held by the frame to act on the frame, at least two drive mechanisms for driving the frame within a plane perpendicular to the optical axis in at least two directions which are not parallel to each other with forces corresponding to supplied power, at least one drive circuit for driving at least two drive mechanisms, a power source for supplying power to at least two drive mechanisms via the drive circuit, and a controller for controlling the drive circuit to set the distance to a predetermined value determined by optical characteristics of the photographing optical system and a moving range of the optical system held by the frame, so as to determine an initial position of a driving center of the frame when the distance between the optical axis and the center of the optical system held by the frame is not less than the predetermined value in a natural state in which the drive mechanism is not operated.

This image shifting apparatus may further comprise a supply power limiter for limiting power supplied to said drive circuit to not more than a predetermined value upon detecting a current or voltage from the power source in order to limit a total value of power supplied to at least two drive mechanisms.

In addition, in the image shifting apparatus, the predetermined value can be determined in relation to an aberration of the photographing optical system.

In order to solve the above problems, according to another aspect of the present invention, there is provided an image shifting apparatus comprising a frame for holding at least a portion of a photographing optical system, a holding mechanism for holding the frame, and causing a force corresponding to a distance between the optical axis and a center of the optical system held by the frame to act on the frame, at least two drive mechanisms for driving the frame within a plane perpendicular to the optical axis in at least two directions which are not parallel to each other with forces corresponding to supplied power, at least one drive circuit for driving at least two drive mechanisms, a power source for supplying power to at least two drive mechanisms via the drive circuit, and a supply power limiter for limiting power supplied to said drive circuit to not more than a predetermined value upon detecting a current or voltage from the power source in order to limit a total value of power supplied to at least two drive mechanisms.

In the image shifting apparatus, the supply power limiter detects a residual energy amount of the power source, and limits power supplied to the drive mechanisms to not more than a predetermined value in accordance with the residual energy amount.

BRIEF DESCRIPTION OF THE DRAWINGS

FIG. 2 is a front view for explaining a mechanism for driving the VR lens of the camera of the first embodiment;

FIG. 3 is a sectional view taken along a line III—III of the mechanism for driving the VR lens in FIG. 2;

FIG. 7 is a view for explaining a mechanism for driving the VR lens of the camera of the second embodiment;

FIG. 8 is a sectional view taken along a line VIII—VIII of the mechanism for driving the VR lens in FIG. 7;

DETAILED DESCRIPTION OF THE PREFERRED EMBODIMENTS

The first embodiment of the present invention will be described in detail below with reference to FIGS. 1 to 5.

Figure 1:
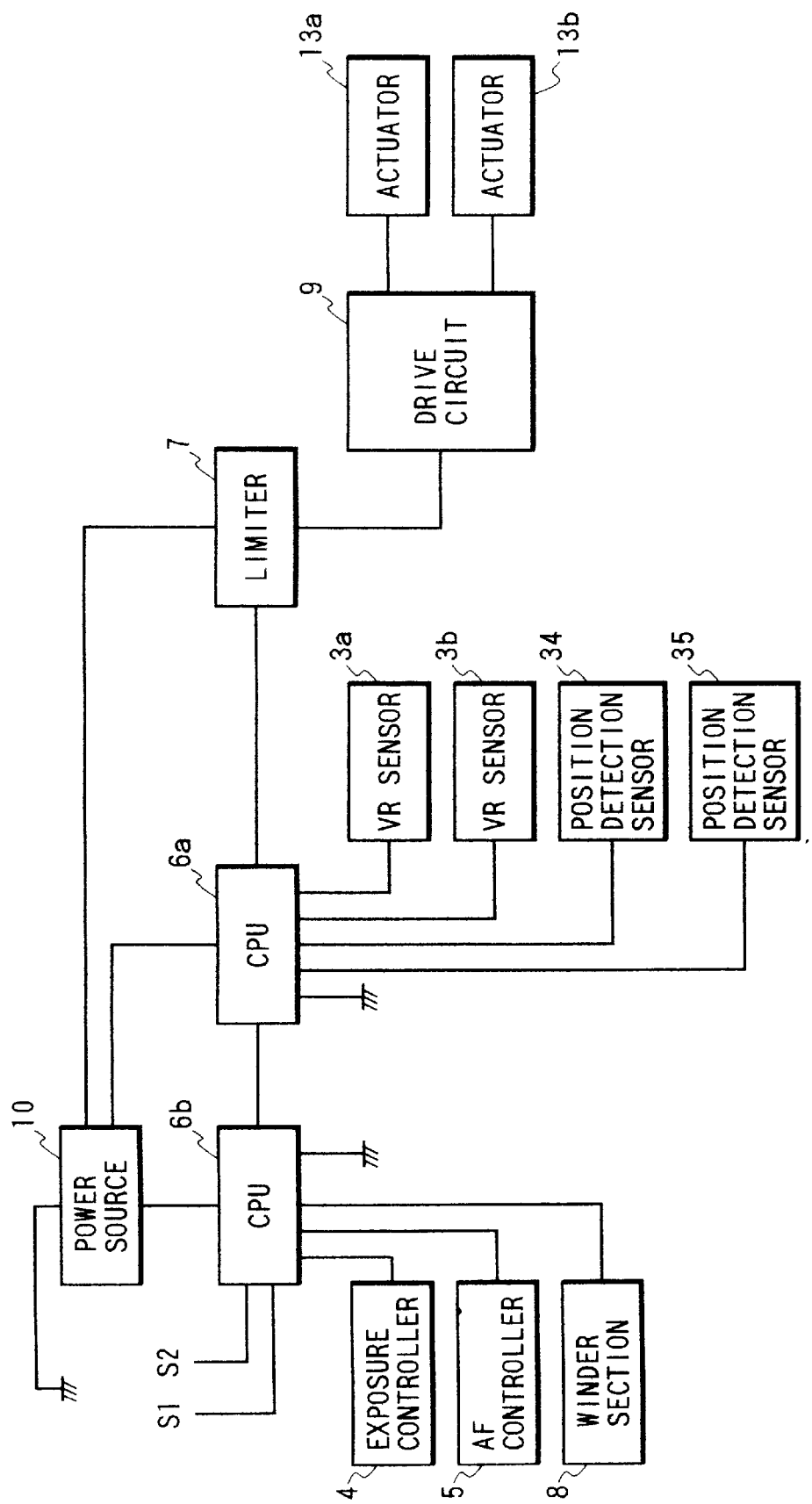
FIG. 1 is a block diagram for explaining the arrangement of a camera according to the first embodiment of the present invention.

FIG. 1 is a block diagram for explaining the arrangement of a camera using an image shifting apparatus according to the present invention.

A power source 10 supplies power to the camera when a main switch (not shown) is turned on.

A switch S1 is turned on upon half depression of the release button. A switch S2 is turned on upon full depression of the release button. When the switch S1 is turned on, preparations for photography, e.g., adjustment of a shutter speed and a focal length, are made. When the switch S2 is turned on, a release operation is performed to start an exposure operation.

A CPU 6a is an electronic circuit for controlling an AE sensor (not shown) for detecting the amount of light from an object, an AF sensor (not shown) for detecting the distance to the object, VR sensors 3a and 3b, and position detection sensors 34 and 35, or detecting/processing outputs from these sensors. The VR sensors 3 detect the fluctuations of the camera. On the basis of outputs from the VR sensors 3, the CPU 6a detects the posture (position, velocity, acceleration, angle, angular velocity, angular acceleration, and the like) of the camera at the moment. The position detection sensors 34 and 35 are sensors for detecting the position of a lens frame 23 (to be described later).

A CPU 6b is an electronic circuit for controlling an exposure controller 4, an AF controller 5, and a winder section 8 on the basis of detection results obtained by the AE sensor, the AF sensor, and the like and transmitted from the CPU 6a. The exposure controller 4 adjusts the exposure amount in performing photography by controlling stop and shutter mechanisms (not shown) on the basis of the detection result obtained by the AE sensor. The AF controller 5 controls the focusing operation of an optical system (not shown) on the basis of an output from the AF sensor. The winder section 8 performs a film winding operation or the like after a photographing operation or the like.

Actuators 13a and 13b drive the lens frame 23 within a plane almost perpendicular to the optical axis. In this embodiment, VCMs are used as these actuators. The VCMs will be described in detail with reference to FIG. 2.

A drive circuit 9 is a circuit for driving the actuators 13a and 13b upon reception of a control signal transmitted from the CPU 6a via a limiter 7.

The limiter 7 is a circuit for detecting a current supplied from the power source 10 to the drive circuit 9, and limiting the detected value, i.e., the total value of currents supplied to the actuators 13a and 13b, so as not to exceed a predetermined value (to be referred to as a "set value" hereinafter). In this case, the set value in the limiter 7 is set to a value corresponding to the power source 10 used by the camera. The set value in the limiter 7 is set to a proper value in accordance with the type of the power source 10 (e.g., a large power source externally connected to the camera or a small dry battery incorporated in the camera). Alternatively, the residual energy amount of the power source 10 is detected from its electromotive force or the like, and the set value is changed stepwise on the basis of the detection result.

FIGS. 2 and 3 are views for explaining a mechanism for driving the VR lens. FIG. 2 is a front view of the mechanism including the VR lens. FIG. 3 is a sectional view taken along a line III—III in FIG. 2.

The circular member drawn in almost the center of FIG. 2 is a VR lens 21. The lens holder 22 holds the VR lens 21 at its circumference. The lens frame 23 holds the lens holder 22 at its circumference.

Elastic members 36 to 39 are metal wires or the like for supporting the lens frame 23 in a lens barrel. The elastic members 36 to 39 are arranged to be parallel to the optical axis, and have almost the same length. The lens frame 23 supported by these members is therefore movable in an arbitrary direction within a plane perpendicular to the optical axis. When the lens frame 23 moves, it does not tilt with respect to the plane.

A coil 24, a magnet 26, and yokes 28 and 40 (or a coil 25, a magnet 27, and yokes 29 and 41) constitute the actuator 13 in FIG. 1, i.e., a voice coil motor (VCM).

The coils 24 and 25 are coil members made of elongated conductive wires. Each coil has a shape similar to the track of an athletic field, and is constituted by two parallel straight portions and two semicircular portions connecting the ends of the straight portions to each other. The coils 24 and 25 are mounted on outer edge portions of the lens frame 23 such that perpendicular bisectors of the respective straight portions cross each other at an almost right angle at almost the center of the VR lens 21.

The yokes 28 and 40 and the magnet 26 are members for forming a magnetic field crossing the coil 24 in the optical axis direction. The yokes 28 and 40 are arranged to sandwich the coil 24 in the optical axis direction. Similarly, the yokes 29 and 41 and the magnet 27 are members for forming a magnetic field crossing the coil 25. The yokes 29 and 41 are arranged to sandwich the magnet 27 in the optical axis direction. The yoke 29 and the magnet 27 are arranged to sandwich the coil 25 in the optical axis direction.

The coils 24 and 25 are connected to the drive circuit 9 described above, and receive currents from the power source 10 via the drive circuit 9. When a current flows in the coil 24 (25), an electromagnetic force (to be referred to as "thrust" hereinafter) is generated between the current and a magnetic field generated by the magnet 26 (27). The direction of this thrust changes depending on the direction of a current flowing in the coil 24 (25). The magnitude of the thrust changes in proportion to the magnitude of a current.

The lens position detector 30 (31) is a projection formed on a side surface of the lens frame 23 to be located on the extended line of a perpendicular bisector (x-axis) of the straight portions of the AF controller 5 (a perpendicular bisector (y-axis) of the coil 24). A slit 32 (33) is formed in the center of the projection to allow a light beam to propagate almost in the optical axis direction.

A photointerrupter 34a (35a) is a member mainly constituted by light-emitting and light-receiving portions. The photointerrupter 34a (35a) is arranged such that the light-emitting and light-receiving portions sandwich a lens position detector 30 (31) (see FIG. 3). With this arrangement, the photointerrupter 34a (35a) can detect the moving amount of the lens frame 23 in the x-axis direction (y-axis direction) by making the light-receiving portion detect light emitted from the light-emitting portion and transmitted through the slit 32. Information associated with the moving amount of the lens frame 23 which is detected by the photointerrupter 34a is fed back to the CPU 6a. On the basis of this information, the CPU 6a then outputs a new control signal for controlling the actuator 13 to the drive circuit 9. In this embodiment, by repeating such an operation, the VR lens 21 is set to a predetermined position, thus performing vibration reduction.

The operation of the drive mechanism for the VR lens 21 will be described next.

As described above, upon reception of a control signal from the CPU 6a, the drive circuit 9 supplies proper currents to the coils 24 and 25, respectively, to drive the actuator 13. With this operation, the VR lens 21 is driven by an electromagnetic force (thrust) generated by the interaction between the currents flowing in the coils 24 and 25 and the magnetic fields generated by the magnets 26 and 27. When the VR lens 21 is moved from the center of the optical axis by this thrust, the elastic members 36 to 39 supporting the lens frame 23 deflect to generate a biasing force toward the optical axis. As a result, the VR lens 21 moves to the position where the thrust generated by the coils 24 and 25 balances with the biasing force generated by the elastic members 36 to 39.

In practice, the total mass of the mechanism for driving the VR lens 21 acts as a force exerted on the elastic members 36 to 39 in the gravitation direction, and various forces are generated when the VR lens 21 is driven/controlled. For this reason, the VR lens 21 moves to the position where these forces balance with the thrust. In addition, since back electromotive forces are generated in the coils 24 and 25 upon movement of the VR lens 21, the thrust generated by the VCMs decreases. As a result, the VR lens 21 moves to the position where the decreased thrust balances with the biasing force.

In this embodiment, the limiter 7 is disposed between the power source 10 and the drive circuit 9 to limit the total value of currents supplied to the coils 24 and 25 to a predetermined value or less. With this operation, the driving range of the VR lens 21 is limited within a predetermined range. The driving range of the VR lens 21 will be described below.

For the sake of descriptive convenience, assume that only two types of forces, i.e., a thrust generated by the VCMs and the biasing force of the elastic members which is generated upon movement of the VR lens 21 (lens frame 23), act on the lens frame 23.

The thrust generated by the VCMs increases in proportion to the magnitude of each current. The biasing force of the elastic members, which acts against the thrust, is proportional to the distance between the center of the VR lens 21 and the optical axis.

Assume that when currents Ia and Ib are respectively supplied to the coils 24 and 25, the center of the VR lens 21 moves to a position (x,y) in a coordinate system centered on the optical axis. Letting B be the magnetic flux density of the magnetic field which is generated at the position of each coil by each magnet, and L be the length by which each coil can effectively generate an electromagnetic force using a magnetic force and a current, then a total F1 of forces generated by the two VCMs including the coils 24 and 25 is given by $$F1 = Ia \cdot B \cdot L + Ib \cdot B \cdot L \quad (1)$$

Assume, however, that the magnetic flux density B and the length L in one VCM are equal to those in the other VCM. Also, F1 represents only the magnitude but does not represent any direction.

Letting k be the spring constant of the overall elastic members, a force F2 generated by the elastic members is the total of a force kx in the x direction and a force ky in the y direction, and given by $$F2 = kx + ky \quad (2)$$

Letting I be the total value of currents flowing in the two VCMs, then $$I = Ia + Ib \quad (3)$$

Since the VR lens 21 is set to the position where the forces F1 and F2 balance with each other, $$F1 = F2 \quad (4)$$

Figure 4:
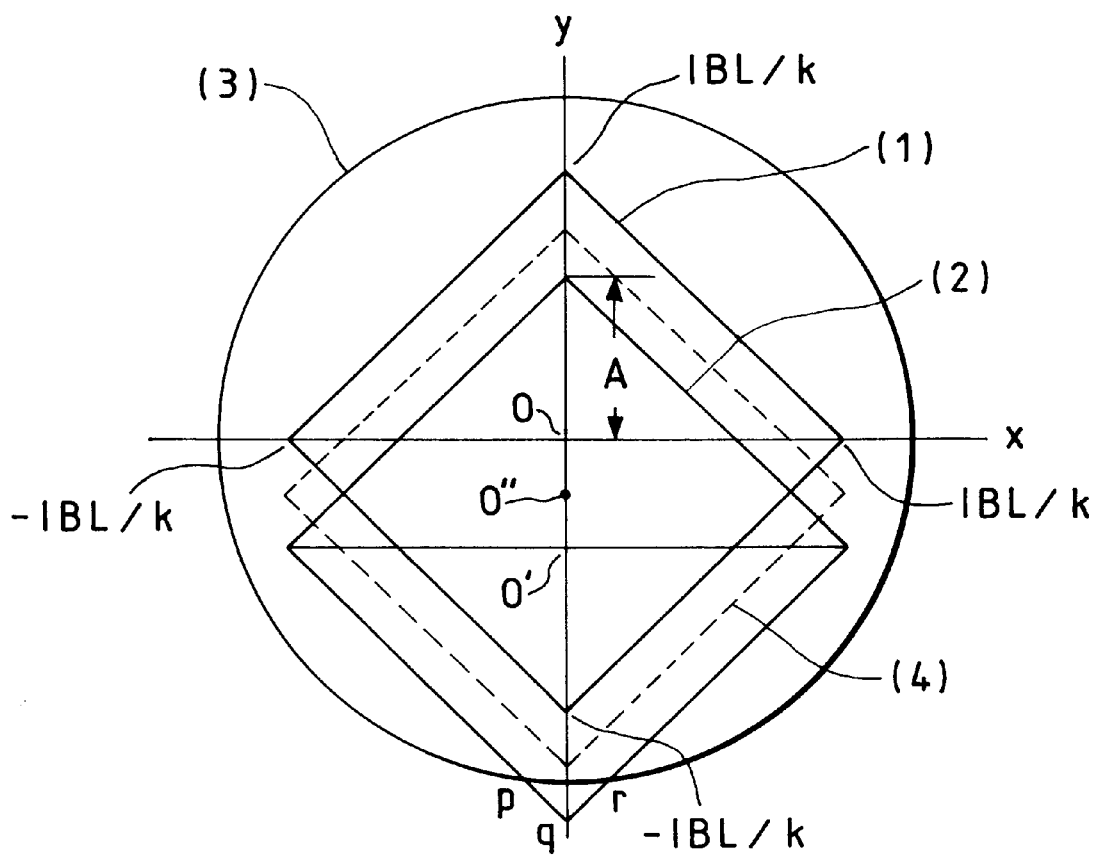
FIG. 4 is a view showing the range in which the VR lens of the camera of the first embodiment moves.

The relationship between the total value I of currents flowing in the two VCMs and the center position (x,y) of the VR lens 21 is obtained from equations (1) to (4). FIG. 4 shows the result. Referring to FIG. 4, a range (1) is the range in which the center of the VR lens 21 can move upon VR driving. A range (3) in FIG. 4 indicates a case wherein when the center of the VR lens 21 moves out of this range, an object image on the photographing plane is influenced by an aberration, and the image deteriorates.

In this case, as the set value in the limiter 7 is changed, i.e., the value I in equation (3) is changed, the range (1) is widened or narrowed. That is, a proper set value in the limiter 7 can prevent the lens frame 23 from colliding with the lens barrel or the like upon excessive movement of the lens frame 23, and prevent generation of noise, an operation error of the camera due to an impact, and the like.

To limit current supply by using the limiter 7 is to limit power consumed by the actuators 13 and the like because the resistances of the actuators 13 and the like are almost constant. That is, by setting the set value in the limiter 7 to a value corresponding to the power source 10 used by the camera, power consumed by the drive mechanism for the VR lens 21 can be saved, and the service life of the power source 10 can be prolonged.

In the above example of calculation, no consideration is given to gravity components. In a normal photographing operation, however, since the camera is handled in a state wherein the optical axis is set in an almost horizontal direction, a gravitational force acts on the VR lens and its drive mechanism. For this reason, in a natural state, i.e., a state in which no currents are supplied to the VCMs, the center of the VR lens is located at a position O' below an optical axis O at which the biasing force of the elastic members 36 to 39 balances with the gravitational force. A range (2) in FIG. 4 represents the range in which the center of the VR lens 21 can move in a VR driving operation in consideration of this influence of gravity. As shown in FIG. 4, the range (2) is almost translated from the range (1) in the gravitation direction.

In a conventional image shifting apparatus of this type, the VR lens is driven according to the following two techniques.

In the first technique, before the photographing device is ready to perform a photographing operation, a predetermined initial current (offset current) is supplied to the VCM for generating a drive force in the y direction to move the lens frame 23 upward, thereby aligning the center of the VR lens 21 with the optical axis O. In other words, in this technique, the initial position of the driving center of the lens frame 23 is set to the optical axis O. According to the technique, vibration reduction is performed under the optically optimal condition. However, as indicated in "Related Background Art", since the VCMs are energized even while no vibration reduction is performed, the power consumption becomes large. The service life of the power source 10 is therefore shortened.

In the second technique, vibration reduction is performed while the VR lens is moved downward. According to this technique, the power consumption is not large unlike in the first technique. However, depending on a photographic condition, a portion (a region pqr in FIG. 4) of the driving range (2) of the VR lens falls outside the range (3), and an object image on a photographing plane may be greatly influenced by an aberration as a result of vibration reduction.

In contrast to this, in this embodiment, an offset current smaller than that in the first technique is supplied to the VCM for generating a drive force in the y direction, before the photographing device is ready to perform a photographing operation, so as to align the center of the VR lens with a point O". That is, the initial position of the driving center of the lens frame 23 is set to the point O" instead of the optical axis O. In this case, the point O" is a point on a line segment connecting the point O' and the optical axis O. When VR driving is performed around the point O" as the center, a driving range (4) of the center of the VR lens does not fall outside the range (3). This operation can completely prevent an object image from being influenced by an aberration and the like caused by vibration reduction. In addition, in this embodiment, since the required offset current is smaller than that in the first technique, the power consumption is small, and the service life of the power source 10 can be increased.

Figure 5:
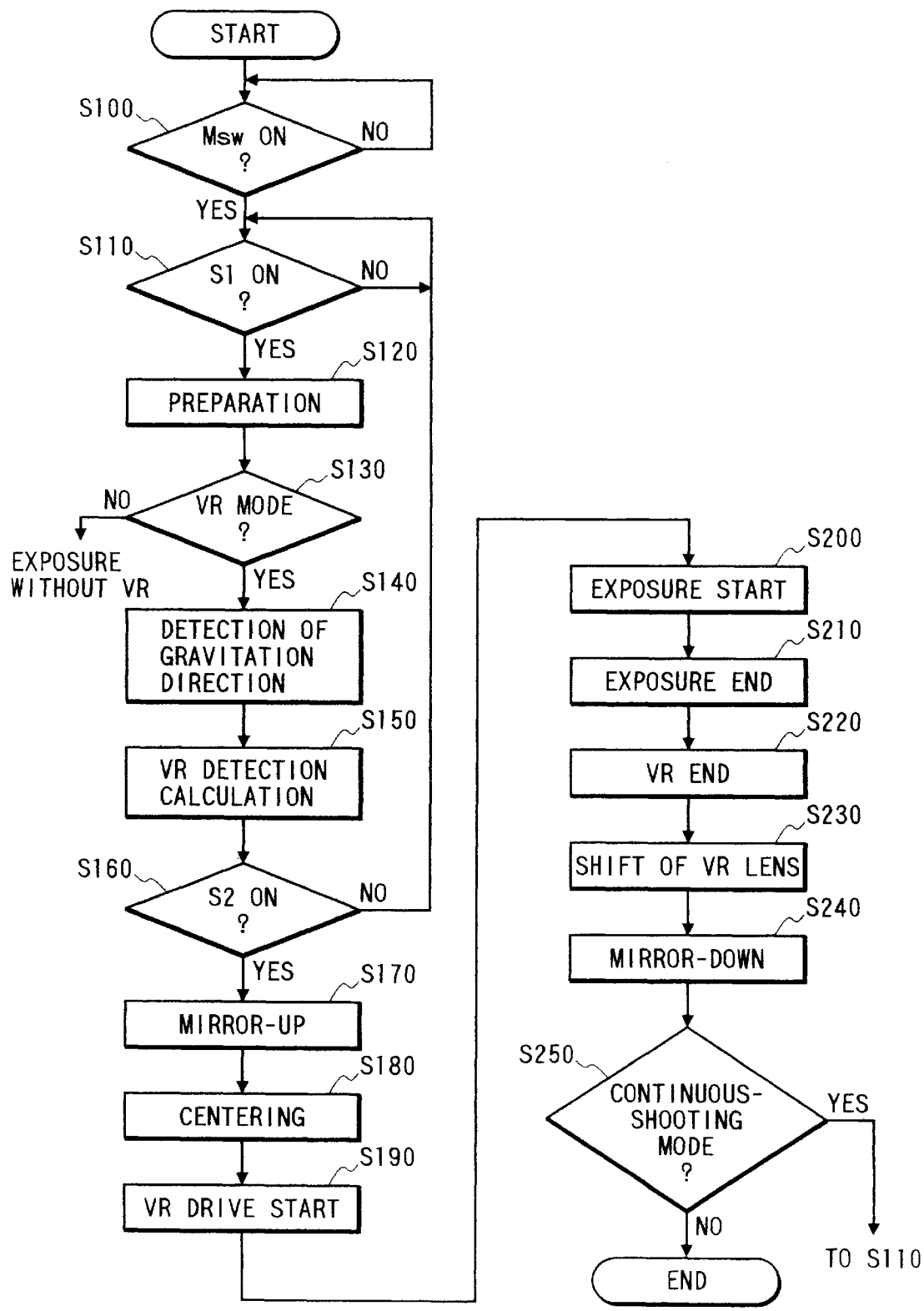
FIG. 5 is a flow chart showing the operation of the camera of the first embodiment.

The main operation of the camera of this embodiment will be described next. FIG. 5 is a flow chart showing the operation of the camera.

The main switch is turned on first (step S100). When the release button is then depressed to the first stroke to turn on the switch S1 (step S110), power is supplied to the VR sensors 3, the AE sensor, the AF sensor, and the like. As a result, these sensors are activated (step S120). Power is also supplied to the exposure controller 4 and the AF controller 5 to set them in the active state, and the shutter speed and the focal length are adjusted on the basis of outputs from the AE sensor and the AF sensor (step S120).

It is checked in step S130 whether the VR mode is set for vibration reduction. If NO in step S130, a normal exposure operation is performed without vibration reduction. If YES in step S130, the flow advances to step S140. In step S140, the actuators 13 are driven to move the lens frame 23 in the x- and y-axis directions, and a change in the position of the lens frame 23 is detected by the photointerrupters 34a and 35a. With this operation, the amount and direction of an offset between the center of the VR lens 21 and the optical axis are obtained. In step S150, the CPU 6a calculates the drive amount, drive speed, drive direction, and the like of the VR lens 21 on the basis of the outputs from the VR sensors 3.

When the release button is depressed to the second stroke to turn on the switch S2 (step S160), a mirror-up operation is performed (step S170).

The center of the VR lens 21 is then aligned with the point O" described above to prepare for a VR operation (step S180). More specifically, the amount of offset between the center of the VR lens 21 and the optical axis, which is detected in step S140, is compared with a predetermined distance stored in a storage unit (not shown) in advance, i.e., the distance between the points O and O". If it is determined that the former is larger than the latter, the center of the VR lens 21 is moved to the point O". Otherwise, the VR lens 21 is not moved.

A control signal is transferred from the CPU 6a to the drive circuit 9. In accordance with this signal, the drive circuit 9 drives the actuators 13 to start VR driving so as not to move an object image on the photographing plane (step S190). In addition, immediately after the VR lens 21 is driven, the exposure controller 4 controls the shutter mechanism and the like to expose a film (not shown) in accordance with a predetermined exposure value obtained from the output from the AE sensor (step S200).

After the exposure operation is completed (step S210), the VR driving operation is completed (step S220). The VR lens 21 is moved to the position where the center is aligned with the point O" (step S230). After a mirror-down operation is performed (step S240), it is checked whether the continuous-shooting mode is set (step S250). If NO in step S250, the process is terminated. If YES in step S250, the flow returns to step S110, and steps S110 to S240 are repeated.

The present invention is not limited to the above embodiment. The above embodiment is merely an example, and any device which has substantially the same arrangement and the same effects as those based on the technical concept described in the appended claims of the present invention fall within the technical scope of the present invention.

In the above embodiment, the limiter 7 limits the total value of currents supplied to the actuators 13a and 13b to a predetermined value or less. However, since the resistances of the drive circuit 9 and the VR sensors 3 are almost constant, the total value of the voltage applied to the actuators 13a and 13b may be limited to a predetermined value or less to obtain the same effects as described above.

Alternatively, the limiter 7 may independently limit each of currents (voltages) supplied to the actuators 13a and 13b to a predetermined value or less. In this case, the driving range of the VR lens 21 is similar to the range (3) in FIG. 5.

As described in detail above, according to the present invention, when the distance between the optical axis and the center of the optical system held by the frame member is larger than a predetermined value determined by the optical characteristics of the photographing optical system and the driving range of the optical system held by the frame member in a natural state, the control unit controls the drive circuit to set the distance to the predetermined value, thereby setting the initial position of the driving center of the frame member. This operation can completely prevent an aberration and the like from influencing an object image upon vibration reduction. At the same time, the power consumption can be decreased, and the service life of the power source can be prolonged.

The frame member supporting at least a portion of the photographing optical system is driven by two or more drive mechanisms for generating forces corresponding to supplied power. The supply power limiting unit limits the total value of power supplied to the two or more drive mechanisms to a predetermined value or less. An image shifting apparatus having a small power consumption can therefore be provided.

The second embodiment of the present invention will be described next with reference to FIGS. 6 to 10.

Figure 6:
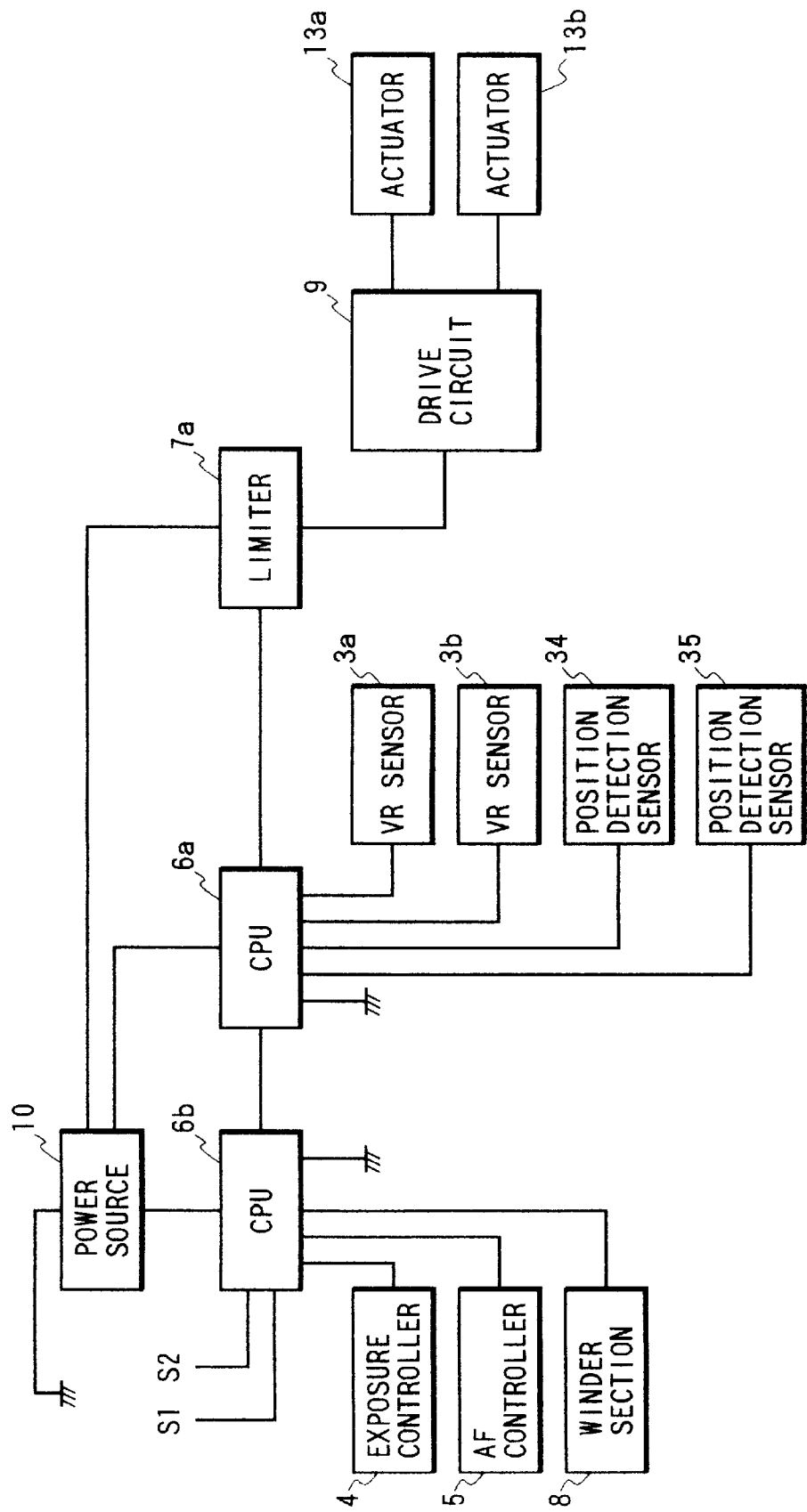
FIG. 6 is a block diagram for explaining the arrangement of a camera according to the second embodiment of the present invention.

FIG. 6 is a block diagram for explaining the arrangement of a camera using an image shifting apparatus according to the present invention. This camera has the same arrangement as that of the camera of the first embodiment except for a limiter 7a. For this reason, the same reference numerals in FIG. 7 denote the same parts as in FIG. 1, and a description thereof will be omitted.

FIGS. 7 and 8 are views for explaining a mechanism for driving the VR lens of this embodiment. FIG. 7 is a front view showing the mechanism including the VR lens. FIG. 8 is a sectional view taken along VIII—VIII in FIG. 7. Since this mechanism is also the same as that shown in FIGS. 2 and 3, a description thereof will be omitted.

Figure 9:
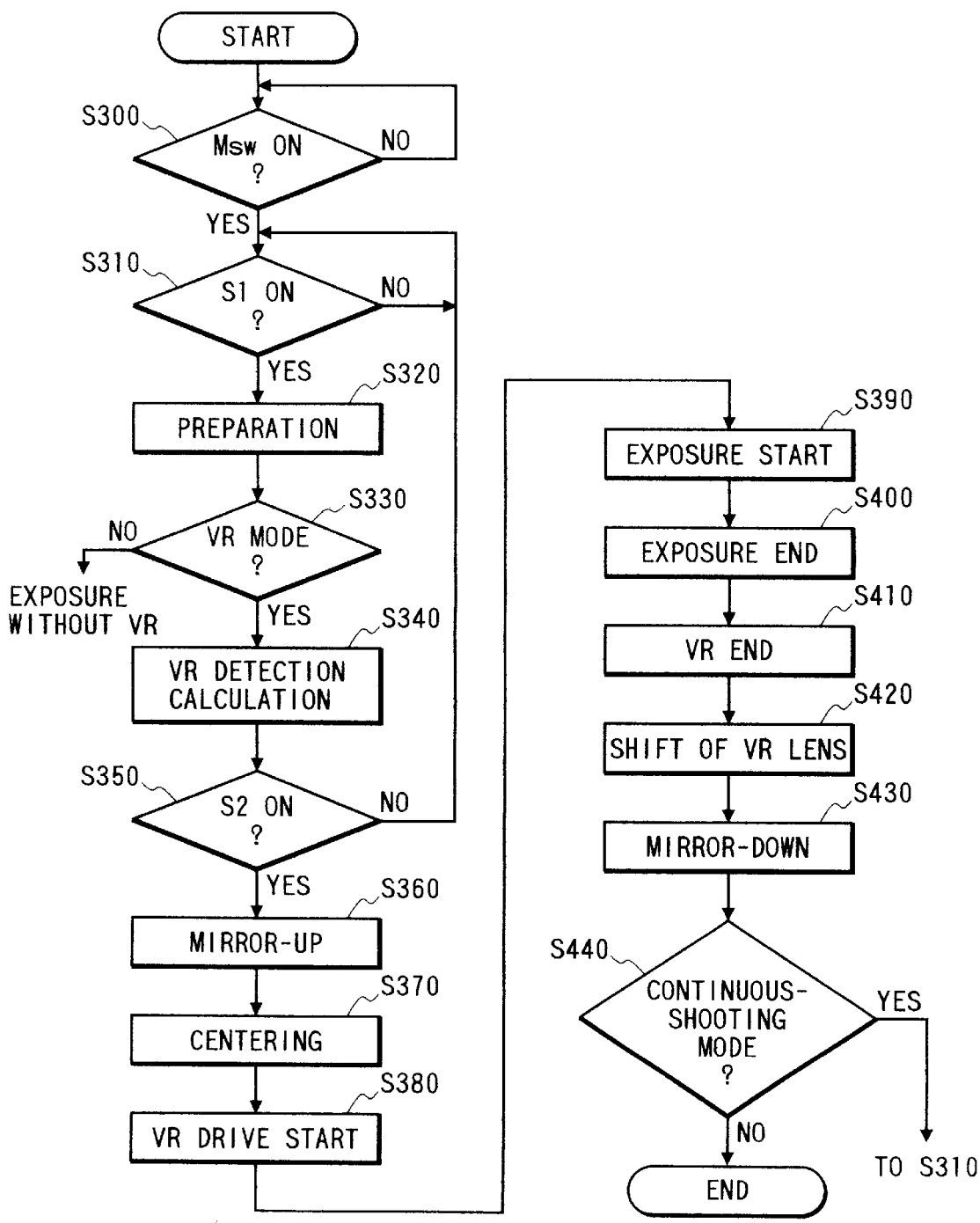
FIG. 9 is a flow chart showing the operation of the camera of the second embodiment.

The main operation of the camera of this embodiment will be described next. FIG. 9 is a flow chart showing the operation of this embodiment.

In this embodiment, the main switch is turned on first (step S300). When the release button is then depressed to the first stroke to turn on a switch S1 (step S310), power is supplied to VR sensors 3, the AE sensor, the AF sensor, and the like. As a result, these sensors are activated. Power is also supplied to an exposure controller 4 and an AF controller 5 to set them in the active state, and preparations for photography, e.g., adjustment of the shutter speed and the focal length, are made on the basis of outputs from the AE sensor and the AF sensor (step S320).

It is checked in step S330 whether the VR mode is set for vibration reduction. If YES in step S330, the flow advances to step S340. If NO in step S330, a normal exposure operation is performed without vibration reduction.

A CPU 6a calculates the drive amount, drive speed, drive direction, and the like of a VR lens 21 on the basis of the outputs from the VR sensors 3 (step S340).

When the release button is depressed to the second stroke to turn on a switch S2 (step S350), a mirror-up operation of the camera is performed (step S360). The VR lens 21 is centered such that the center is aligned with the optical axis of the optical system (see FIG. 7) (step S370), thus preparing for a subsequent vibration reduction operation.

A control signal is transferred from the CPU 6a to a drive circuit 9. In accordance with this signal, the drive circuit 9 drives actuators 13 to drive the VR lens 21 so as not to move an object image on the photographing plane (step S380). In addition, immediately after the VR lens 21 is driven, the exposure controller 4 exposes a film (not shown) in accordance with a predetermined exposure value obtained from the output from the AE sensor (steps S390 and S400).

After the exposure operation is completed, driving of the VR lens 21 is completed (step S410). In addition, after the VR lens 21 is moved to a predetermined position, e.g., the optical axis center (step S420), a mirror-down operation is performed, thus completing one photographing operation (step S430).

Subsequently, it is checked whether the continuous-shooting mode is set (step S440). If NO in step S440, the process is terminated. If YES in step S440, the flow returns to step S310, and steps S310 to S430 are repeated.

The operation of the drive mechanism for the VR lens 21 will be described next.

As described above, upon reception of a control signal from the CPU 6a, the drive circuit 9 supplies proper currents to coils 24 and 25, respectively, to drive the actuators 13. With this operation, the VR lens 21 is driven by a thrust generated by the interaction between the currents flowing in the coils 24 and 25 and magnetic fields generated by magnets 26 and 27. When the VR lens 21 is moved from the optical axis center by this thrust, elastic members 36 to 39 supporting a lens frame 23 deflect to generate a biasing force toward the optical axis. As a result, the VR lens 21 moves to the position where the thrust generated by the coils 24 and 25 balances with the biasing force generated by the elastic members 36 to 39.

In practice, the total mass of the mechanism for driving the VR lens 21 acts as a force exerted on the elastic members 36 to 39 in the gravitation direction, and various forces are generated when the VR lens 21 is driven/controlled. For this reason, the VR lens 21 moves to the position where these forces balance with the thrust. In addition, since back electromotive forces are generated in the coils 24 and 25 upon movement of the VR lens 21, the thrust generated by the VCMs decreases. As a result, the VR lens 21 moves to the position where the decreased thrust balances with the biasing force.

In the camera of this embodiment, a limiter 7a is interposed between a power source 10 and the drive circuit 9 to limit the total value of currents supplied to the coils 24 and 25 to a predetermined value or less. The driving range of the VR lens 21 is limited within a predetermined range. The driving range of the VR lens 21 will be described below.

For the sake of descriptive convenience, assume that only two types of forces, i.e., a thrust generated by the VCMs and the biasing force of the elastic members which is generated upon movement of the VR lens 21 (lens frame 23), act on the lens frame 23.

The thrust generated by the VCMs increases in proportion to the magnitude of a current. The biasing force of the elastic members, which acts against the thrust, is proportional to the distance between the center of the VR lens 21 and the optical axis.

Assume that when currents Ia and Ib are respectively supplied to the coils 24 and 25, the center of the VR lens 21 moves to a position (x,y) in a coordinate system centered on the optical axis. Letting B be the magnetic flux density of the magnetic field which is generated at the position of each coil by each magnet, and L be the length by which each coil can effectively generate an electromagnetic force using a magnetic force and a current, then a total F1 of forces generated by the two VCMs including the coils 24 and 25 is given by $$F1 = Ia \cdot B \cdot L + Ib \cdot B \cdot L \tag{1}$$

Assume, however, that the magnetic flux density B and the length L in one VCM are equal to those in the other VCM. Also, F1 represents only the magnitude but does not represent any direction.

Letting k be the spring constant of the overall elastic members, a force F2 generated by the elastic members is the total of a force kx in the x direction and a force ky in the y direction, and given by $$F2 = kx + ky \tag{2}$$

Letting I be the total value of currents flowing in the two VCMs, then $$I = Ia + Ib \tag{3}$$

Since the VR lens 21 is set to the position where the forces F1 and F2 balance with each other, $$F1 = F2 \tag{4}$$

Figure 10:
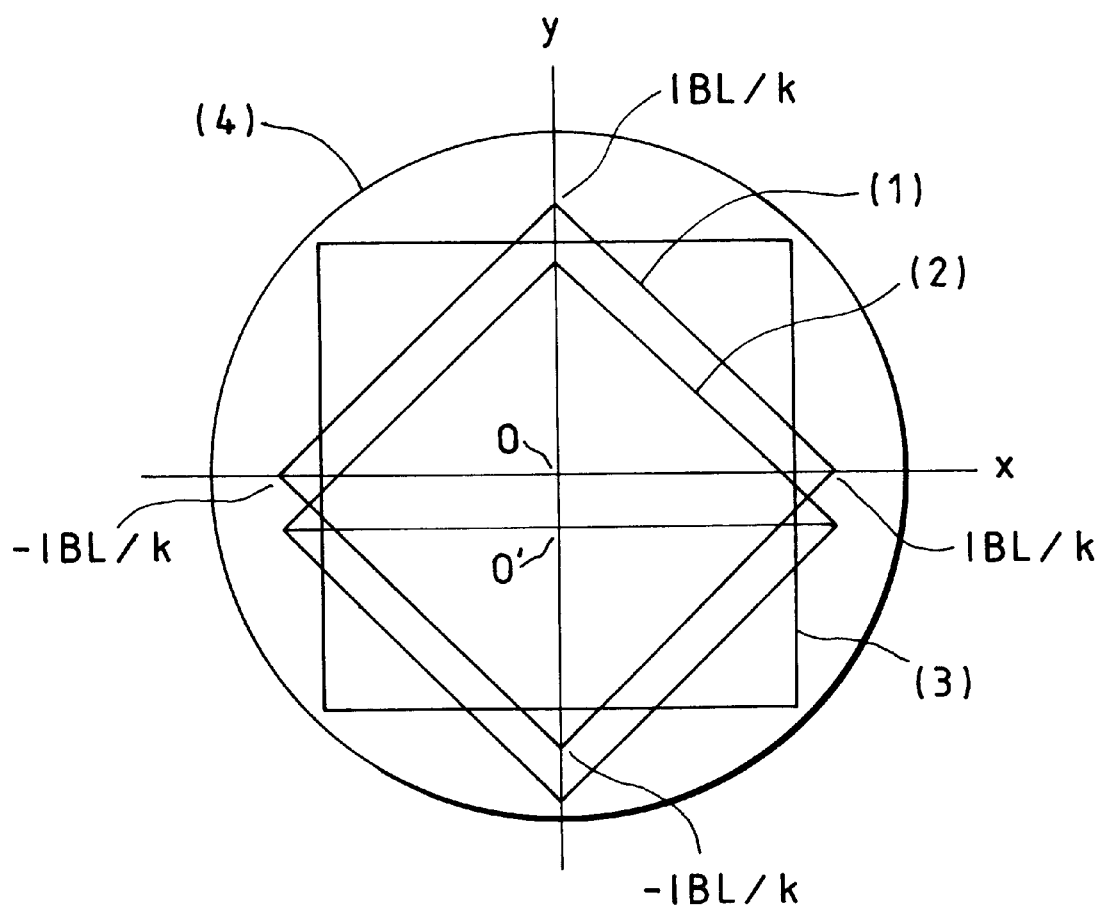
FIG. 10 is a view showing the range in which the VR lens of the camera of the second embodiment moves.

The relationship between the total value I of currents flowing in the two VCMs and the center position (x,y) of the VR lens 21 is obtained from equations (1) to (4). FIG. 10 shows the result. Referring to FIG. 10, a range (1) is the range in which the center of the VR lens 21 can move.

In a normal photographing operation, however, since the camera is handled in a state wherein the optical axis is set in an almost horizontal direction, a gravitational force acts on the VR lens and its drive mechanism, as described above. A range (2) in FIG. 10 represents the range in which the center of the VR lens 21 can move in consideration of this influence of gravity. As shown in FIG. 10, the range (2) is almost translated from the range (1) in the gravitation direction.

As described above, in this embodiment, the drive mechanism for driving the VR lens 21 is constituted by the VR sensors 3, the CPU 6a, the limiter 7a, the drive circuit 9, the power source 10, the actuators 13, the elastic members 36 to 39, and the like. As each actuator 13, a VCM for generating thrust proportional to a current supplied is used. The total value of currents supplied to the drive circuit 9 and the actuators 13 is limited by the limiter 7a to a predetermined value (to be referred to as a "set value" hereinafter) or less.

To limit current supply by using the limiter 7a is to limit power consumed by the actuators 13 and the like because the resistances of the actuators 13 and the like are almost constant. That is, by setting the set value in the limiter 7a to a value corresponding to the power source 10 used by the camera, power consumed by the drive mechanism for the VR lens 21 can be saved, and the service life of the power source 10 can be prolonged.

In this case, "setting the set value in the limiter 7a to a value corresponding to the power source 10 used by the camera" means setting a set value to a proper predetermined value in accordance with the type of the power source 10 (e.g., a large power source externally connected to the camera or a small dry battery incorporated in the camera), or detecting the residual energy amount of the power source 10 from its electromotive force or the like, and changing the set value stepwise or continuously on the basis of the detected residual energy amount.

In the camera of this embodiment, since the supply currents are limited by the limiter 7a, the moving range of the VR lens 21 is limited. That is, the moving range of the VR lens 21 is arbitrarily increased or decreased according to a set value in the limiter 7a. In this embodiment, therefore, a proper set value can prevent the lens frame 23 from colliding with the lens barrel or the like, and preventing an operation error and the like in the camera due to generation of noise and an impact. This also prevents supply of excessive currents to the actuators 13 after the lens frame 23 is brought into contact with the lens barrel and comes to a standstill. From this viewpoint as well, this embodiment can limit consumption of power, and prolong the service life of the power source.

In this embodiment, as described above, the moving range of the VR lens 21 is limited to prevent an object image on the photographing plane from being influenced by an aberration caused upon excessive movement of the VR lens 21. That is, reduction limitation described in the prior art can be performed. In this case, as shown in FIG. 10, the set value in the limiter 7a is adjusted such that the moving ranges (1) and (2) of the VR lens 21 are present within the allowable range (4) in which the influence of an aberration on an object image on a photographing plane is allowed. In this embodiment, reduction limitation is performed without using the position information of the VR lens 21. For this reason, reduction limitation can be realized with a simple control system as compared with the prior art.

In the above embodiment, the limiter 7a limits the total value of currents supplied to the actuators 13a and 13b to a predetermined value or less. However, since the resistances of drive circuit 9 and the VR sensors 3 are almost constant, the total value of the voltages applied to the actuators 13a and 13b may be limited to a predetermined value or less to obtain the same effects as described above.

Alternatively, the limiter 7a may independently limit each of currents (voltages) supplied to the actuators 13a and 13b to a predetermined value or less. In this case, the moving range of the VR lens 21 is similar to the range (3) in FIG. 10.

The present invention is not limited to the above embodiment. The above embodiment is merely an example, and any device which has substantially the same arrangement and the same effects as those based on the technical concept described in the appended claims of the present invention fall within the technical scope of the present invention.

What is claimed is:

1. An image shifting apparatus comprising:
   a frame to hold at least a portion of a photographing optical system;
   a holding mechanism to hold said frame within a plane substantially perpendicular to an optical axis of the photographing optical system, and to cause a force corresponding to a distance between the optical axis and a center of the optical system held by said frame to move said frame;
   at least two drive mechanisms to drive said frame within a plane perpendicular to the optical axis in at least two directions which are not parallel to each other with forces corresponding to supplied power;
   a drive circuit to drive said at least two drive mechanisms;
   a power source to supply power to said at least two drive mechanisms via said drive circuit; and
   a controller to control said drive circuit to set the distance between the optical axis and the center of the optical system held by said frame to a predetermined value determined by optical characteristics of the photographing optical system and a moving range of the optical system held by said frame, so as to set an initial position of a driving center of said frame to a position which is between the position of the optical axis of the photographing optical system and the center of the optical system held by said frame in a natural state in which said drive mechanism is not operated when the distance between the optical axis and the center of the optical system held by said frame is not less than the predetermined value in the natural state in which said drive mechanism is not operated.

2. An apparatus according to claim 1, further comprising a supply power limiter to monitor a current or voltage supplied from said power source to said drive circuit, and to limit power supplied to said drive circuit to not more than a predetermined value, so as to set a total of power supplied to said drive mechanism to not more than a predetermined value.

3. An apparatus according to claim 1, wherein the predetermined value is determined in relation to an aberration of the optical system.

4. A driving method for an image shifting apparatus including a portion of a photographing optical system held by a frame, comprising:
   driving the portion of the photographing optical system held by the frame by using a force corresponding to a distance between an optical axis and a center of the optical system; setting the distance between the optical axis and the center of the optical system to a predetermined value determined by optical characteristics of the photographing optical system and a moving range of the photographing optical system;
   setting an initial position of a driving center of the frame to a position which is between the position of the optical axis and the center of the optical system held by the frame in a natural state in which no driving is occurring when the distance between the optical axis and the center of the optical system held by the frame is greater than the predetermined value in the natural state in which no driving is occurring.

5. An image shifting apparatus comprising:
   a frame to hold at least a portion of a photographing optical system;
   a holding mechanism to hold said frame within a plane substantially perpendicular to an optical axis of the photographing optical system, and to cause a force corresponding to a distance between the optical axis and a center of the optical system held by said frame to move said frame;
   at least two drive mechanisms to drive said frame within a plane perpendicular to the optical axis in at least two directions which are not parallel to each other with forces corresponding to supplied power;
   a drive circuit to drive said at least two drive mechanisms;
   a power source to supply power to said at least two drive mechanisms via said drive circuit; and
   a controller to control said drive circuit to set the distance between the optical axis and the center of the optical system held by said frame to a predetermined value determined by optical characteristics of the photographing optical system and moving range of the optical system held by said frame, so as to set an initial position of a driving center of said frame to a position shifted from a position of the center of the optical system held by the frame in a natural state in which said drive mechanism is not operated toward the optical axis of the photographing optical system when the distance between the optical axis and the center of the optical system held by said frame is not less than the predetermined value in said natural state.

* * * * *